United States Patent
Samineni

(10) Patent No.: US 11,611,605 B2
(45) Date of Patent: Mar. 21, 2023

(54) DYNAMICALLY MODIFYING AN EXECUTION ENVIRONMENT FOR VARYING DATA

(71) Applicant: Microsoft Technology Licensing, LLC, Redmond, WA (US)

(72) Inventor: Naga Rohit Samineni, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 862 days.

(21) Appl. No.: 15/331,047

(22) Filed: Oct. 21, 2016

(65) Prior Publication Data

US 2018/0115592 A1 Apr. 26, 2018

(51) Int. Cl.
*H04L 29/06* (2006.01)
*H04N 21/466* (2011.01)
(Continued)

(52) U.S. Cl.
CPC ............ *H04L 65/764* (2022.05); *H04L 65/80* (2013.01); *H04N 21/252* (2013.01);
(Continued)

(58) Field of Classification Search
CPC ....... H04L 65/604; H04L 65/80; H04L 67/42; H04N 21/485; H04N 21/4667;
(Continued)

(56) References Cited

U.S. PATENT DOCUMENTS 6,963,360 B1 11/2005 Esquibel et al.
7,925,723 B1 4/2011 Amidon et al.
(Continued)

FOREIGN PATENT DOCUMENTS

| CN | 101099209 A | 1/2008 | |
|---|---|---|---|
| WO | WO-2012013858 A1 * | 2/2012 | ........... H04N 9/8205 |
| WO | 2014036522 | 3/2014 | |

OTHER PUBLICATIONS

Hoffman, Chris, "3 Ways to Normalize Sound Volume on Your PC", Jun. 4, 2012, 5 pages. Available at: http://www.howtogeek.com/115656/3-ways-to-normalize-sound-volume-on-your-pc/.
(Continued)

*Primary Examiner* — Umar Cheema
*Assistant Examiner* — James Ross Hollister
(74) *Attorney, Agent, or Firm* — NovoTechIP International PLLC

(57) ABSTRACT

Examples of the present disclosure describe systems and methods of dynamically modifying execution environment for varying data or executables. The data or executables may be a multimedia file and the execution environment may be multimedia playback settings. In aspects, content comprising various media items may be received by a client device. The media items may be evaluated to determine a set of characteristics for the media items. The set of characteristics may be compared to a user's preferred configuration settings or previously-played media items. Based on the comparison, the set of characteristics may be altered to be consistent with the preferred configuration settings (e.g., a modified set of characteristics may be estimated). The modified media items may then be played under known playback settings. In aspects, the media item under consideration may be played as is using an estimated playback configuration to enable a user-preferable playback experience.

20 Claims, 8 Drawing Sheets

(51) Int. Cl.
*H04N 21/25* (2011.01)
*H04N 21/485* (2011.01)
*H04N 21/472* (2011.01)
*G06N 20/00* (2019.01)
*H04L 65/75* (2022.01)
*H04L 65/80* (2022.01)
*H04L 67/01* (2022.01)

(52) U.S. Cl.
CPC ..... *H04N 21/4661* (2013.01); *H04N 21/4667* (2013.01); *H04N 21/485* (2013.01); *G06N 20/00* (2019.01); *H04L 67/01* (2022.05); *H04N 21/47217* (2013.01)

(58) Field of Classification Search
CPC ............. H04N 21/4661; H04N 21/252; H04N 21/47217; G06F 17/30035; G06N 99/005
See application file for complete search history.

(56) References Cited

U.S. PATENT DOCUMENTS

| | | | |
|---|---|---|---|
| 8,015,306 B2 | 9/2011 | Bowman | |
| 8,158,872 B2 | 4/2012 | Parash | |
| 8,364,011 B2 | 1/2013 | Robert | |
| 8,942,549 B2 | 1/2015 | Duffin et al. | |
| 9,031,244 B2 | 5/2015 | Lang | |
| 9,143,742 B1* | 9/2015 | Amira | H04N 7/181 |
| 9,357,325 B2 | 5/2016 | Lee et al. | |
| 9,973,814 B1* | 5/2018 | Henderson | H04N 9/802 |
| 10,440,082 B1* | 10/2019 | Winston | H04N 21/23805 |
| 2004/0199933 A1 | 10/2004 | Ficco | |
| 2008/0175411 A1 | 7/2008 | Greve | |
| 2009/0183622 A1 | 7/2009 | Parash | |
| 2009/0290725 A1 | 11/2009 | Huang | |
| 2011/0276155 A1 | 11/2011 | Lindahl | |
| 2014/0248036 A1 | 9/2014 | Saari et al. | |
| 2014/0331133 A1* | 11/2014 | Coburn, IV | H04N 21/2541 715/716 |
| 2014/0362997 A1* | 12/2014 | Basso | H04S 7/301 381/21 |
| 2015/0030309 A1 | 1/2015 | Ogawara | |
| 2015/0073574 A1 | 3/2015 | Brenner et al. | |
| 2015/0263693 A1* | 9/2015 | Bush | H03G 5/165 381/56 |
| 2015/0310023 A1* | 10/2015 | van der Heide | G06F 3/165 700/94 |
| 2015/0355878 A1* | 12/2015 | Corbin | G06F 16/64 700/94 |
| 2016/0018959 A1 | 1/2016 | Yamashita et al. | |
| 2016/0026427 A1* | 1/2016 | Kuper | G06F 3/16 700/94 |
| 2016/0100221 A1* | 4/2016 | Hiltch | H04N 21/6125 725/14 |
| 2017/0026015 A1* | 1/2017 | Hartung | H03G 5/005 |
| 2017/0048633 A1* | 2/2017 | Sheen | G10L 21/00 |
| 2017/0331914 A1* | 11/2017 | Loach | H04N 21/25833 |

OTHER PUBLICATIONS

"International Search Report and Written Opinion Issued in PCT Application No. PCT/US2017/057063", dated Jan. 16, 2018, 13 Pages.

Yin, et al., "Socialized Mobile Photography: Learning to Photograph With Social Context via Mobile Devices", In Journal of IEEE Transactions on Multimedia, vol. 16, Issue 1, Jan. 2014, pp. 184-200.

"First Office Action and Search Report Issued in Chinese Patent Application No. 201780064827.0", dated Oct. 12, 2020, 11 Pages.

"Second Office Action and Search Report Issued in Chinese Patent Application No. 201780064827.0", dated Jun. 3, 2021, 8 Pages.

"Office Action Issued in Indian Patent Application No. 201947013307", dated Sep. 21, 2021, 7 Pages.

* cited by examiner

DYNAMICALLY MODIFYING AN EXECUTION ENVIRONMENT FOR VARYING DATA

BACKGROUND

Multimedia services provide various types of content (e.g., audio, video, text, image, etc.) to users. Generally, such content is aggregated from various content providers and information sources. As a result, individual content items often possess media characteristics/playback settings that differ from one another. Moreover, an individual content item may comprise segments having different media characteristics/playback setting. Such variance in media playback setting often requires users to manually adjust their playback settings repeatedly in order to preserve a consistent and satisfactory user experience.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Examples of the present disclosure describe systems and methods of dynamically modifying multimedia playback settings. In aspects, content comprising various media items may be received by a client device. The media items may be evaluated to determine a set of characteristics for the media items. The set of characteristics may be compared to a user's past media characteristics and/or respective playback configurations. In one aspect, based on the comparison, the characteristics of a media item may be altered to be consistent with known media characteristics having a known playback configuration. In another aspect, the playback configurations may be altered based on an estimation of user preferences The media items may be played/executed using the altered configurations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
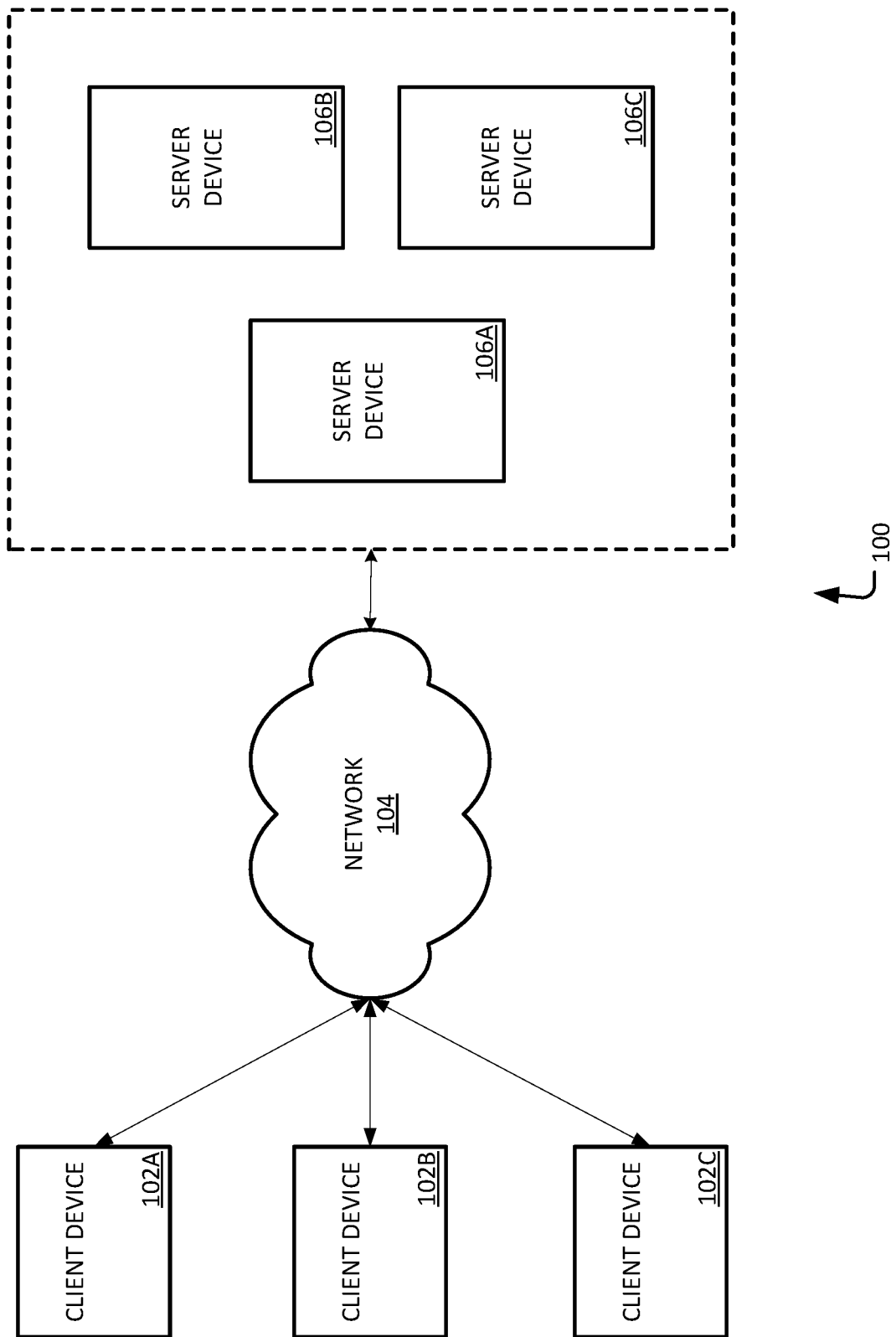
FIG. 1 illustrates an overview of an example system for dynamically modifying multimedia playback settings as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods dynamically modifying multimedia playback settings. In aspects, content (e.g., audio, video, text, image, etc.) comprising various media items (e.g., movies, songs, documents, photos, etc.) may be received by a client device. The media items may be evaluated to determine a set of media data comprising at least one of media characteristics and values associated with the media characteristics. Examples of media characteristics may include metadata (e.g., title, artist, genre, rating, description, encoding parameters, duration, track number, etc.), frequency, amplitude, phase, variance, video frame size, video frame rate, aspect ratio, audio bit rate, audio sample rate, number of channels, channel mappings, character counts, language, font data, image width and height, samples per pixel, digital rights management (DRM) properties, etc. In examples, the evaluation may be performed by a characteristics generator component. A characteristics generator, as used herein, may refer to an algorithm or model for determining and/or recording the characteristics and/or associated characteristics values of a media item. A model, as used herein, may refer to a statistical language model that may be used to determine a probability distribution over one or more word and/or character sequences and/or to predict a response value from one or more predictors. In examples, a model may be a rule-based model, a machine-learned regressor, a machine-learned classifier, a neural network, or the like. In some examples, the set of media data may be precomputed before being transmitted to the client device. For instance, the media data may be computed by a media service or content provider during an offline or maintenance period, when the request for a media item is received by the media service/content provider, or when the media data is being buffered. In other examples, the client device (or a service accessible thereto) may compute a set of media data for media items that have been received or are in the process of being received (e.g., streamed/downloaded) by the client device. In at least one aspect, the scope and duration of configuration settings may be permanent, or may persist until overridden by an action (e.g., the next media file is selected/received) or the expiration of a time period. Configuration settings may be stored in a data store and used to, for example, improve the estimation model.

In aspects, the set of media data may be compared or mapped to the configuration/playback settings (e.g., volume, bass, treble, brightness, hue, saturation, contrast, zoom effects, play order, captions/subtitles, annotations, graphic equalization, play speed, visualization effects, crossfading, auto-volume leveling, accessory modes, video resolution, audio style, auto-play, preferred playback application/service, etc.) for a media item. In examples, the configuration settings may represent a user's preferred configuration settings, and may be determined by evaluating or observing a user profile, a currently-playing media item, or previously-played media items. In at least one example, the evaluation may be performed using an estimator. An estimator, as used herein, may refer to one or more systems, functions and/or models (e.g., a machine-learned model, neural network, decision tree model, etc.) that use media characteristics and/or playback settings to determine or estimate preferred media settings(s). Based on the comparison, the set of media data for a media item may be modified. For example, the set of media settings of a media item may be modified to be consistent with the configuration settings of a user profile, or may be marginally adjusted toward the configuration settings of a previously-played media item. After the modification, the media item may be played or stored, and one or more stored configuration setting may be updated. Alternately, configuration settings may be modified in response to determined media settings for a received media item in order to achieve a consistent playback experience. In a particular example, the modified configuration settings for the media item may be used to train or modify one or more estimators.

Accordingly, the present disclosure provides a plurality of technical benefits including, but not limited to: standardized playback settings per media type; automatic modification of received content; generation of media-specific characteristics for received content; preferred configuration estimation and application; improvement of the user experience; and improvement of the efficiency and quality for applications/services utilizing examples of the present disclosure, among other examples.

FIG. 1 illustrates an overview of an example system 100 for dynamically modifying multimedia playback settings as described herein. Exemplary system 100 presented is a combination of interdependent components that interact to form an integrated whole for dynamically modifying multimedia playback settings. Components of the systems may be hardware components or software implemented on and/or executed by hardware components of the systems. In examples, system 100 may include any of hardware components (e.g., used to execute/run operating system (OS)), and software components (e.g., applications, application programming interfaces (APIs), modules, virtual machines, runtime libraries, etc.) running on hardware. In one example, an exemplary system 100 may provide an environment for software components to run, obey constraints set for operating, and utilize resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic devices. As an example of a processing device operating environment, refer to the exemplary operating environments depicted in FIGS. 4-7. In other examples, the components of systems disclosed herein may be spread across multiple devices. For instance, input may be entered on a client device and information may be processed or accessed from other devices in a network, such as one or more server devices.

As one example, the system 100 comprises client device 102A, client device 102B, client device 102C, distributed network 104, and a distributed server environment comprising one or more servers such as server device 106A, server device 106B and server device 106C. One of skill in the art will appreciate that the scale of systems such as system 100 may vary and may include more or fewer components than those described in FIG. 1. In some examples, interfacing between components of the system 100 may occur remotely, for example, where components of system 100 may be spread across one or more devices of a distributed network.

In aspects, client device 102A may be configured to receive content from a multimedia service or content provider via distributed network 104. The content may comprise media items that are associated with various media playback settings. Client device 102A may further be configured to analyze and/or process the received content. For example, client device 102A may comprise or have access to a media analysis component used to identify and/or determine media characteristics and/or media playback settings for media items. Client device 102A may store the identified and/or determined media characteristics/playback settings in a data store. The data store may comprise at least media characteristics and associated values for previously received media items and/or media playback settings data. In some aspects, client device 102A may compare the determined media characteristics and/or playback settings to an existing set of media characteristics that are mapped to one or more configuration settings. The existing set mappings may be stored in, for example, a user profile, a media settings configuration file, a local buffer, or a data store. In at least one example, the existing set of media configuration settings may be implemented by a predictive model (e.g., a support vector machine (SVM), neural network, etc.) or a component (e.g., an estimation engine, an estimator function, etc.) for estimating configuration preferences. Client device 102A may use at least one of the determined media playback settings and the existing set of media mappings to determine or estimate a preferred set of media configuration settings for one or more types of media items. Based on the preferred set of media configuration settings, client device 102A may modify one or more portions of the determined media playback settings. In some aspects, the modified media playback settings of the received content may be used to automatically update the existing set of media configuration settings and/or to train a predictive model/estimating component. In a particular example, the existing set of media configuration settings and/or predictive model/estimating component may additionally or alternately be modified using a user interface component or other input means accessible to client device 102A. For instance, a user may access a user interface provided by a client device to alter a preferred audio playback volume or video playback brightness, or to rank the importance of media playback settings for particular media types. Client device 102A may further be configured to play or execute the modified content (e.g., the received content with the modified configuration settings) using a media player component for viewing, navigating and/or playing media items.

In aspects, client devices 102B and 102C may be similarly configured to client device 102A, but may be a different device type from client device 102A. For example, a user may use client device 102A (e.g., a mobile phone), client device 102B (e.g., a tablet) and/or client device 102C (e.g., a PC) to solicit multimedia content from a multimedia service. In another example, client devices 102A-C may be owned/operated by the same or separate users, and may be configured to solicit multimedia content from each other as well as from a multimedia service. In such an example, the stored data (e.g., existing media characteristics, media playback settings data, etc.) and components (e.g., data store, buffer, predictive model, estimating component, media player component, etc.) described above may be located on each of the client devices 102A-C, distributed between client devices 102A-C, or located in a shared location accessible to each of client device 102A-C.

Server devices 106A-C may be configured to provide multimedia content to device, such as client device 102A-C. In aspects, server devices 106A-C may include a multimedia service or may otherwise provide access to various multimedia content. Server devices 106A-C may comprise a media analysis component used to identify and/or determine media characteristics and/or playback settings of media items. The media characteristics may be determined prior to sending the media item or as part of the request for access to the media item. In examples, server devices 106A-C may provide an indication of the determined media characteristics of a media item when transmitting the media item to a client device. For instance, the indication may be included in the media item, stored in the media item metadata, or transmitted as a separate file to the client device.

Figure 2:
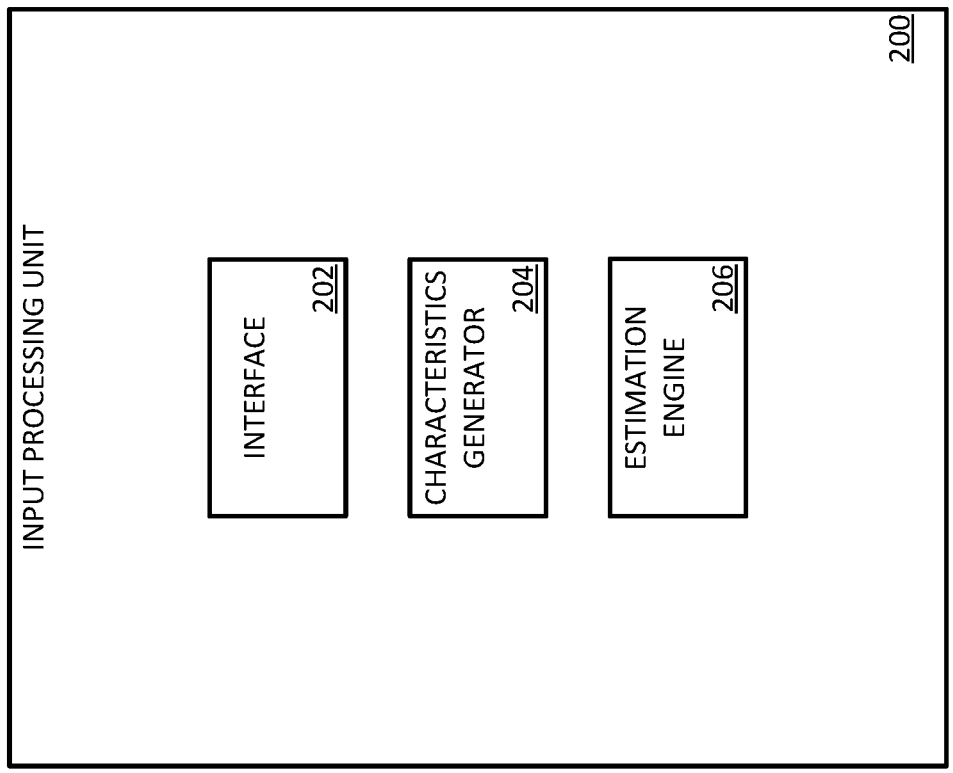
FIG. 2 illustrates an exemplary input processing unit for dynamically modifying multimedia playback settings as described herein.

FIG. 2 illustrates an overview of an exemplary input processing unit 200 for dynamically modifying multimedia playback settings, as described herein. The dynamic modification techniques implemented by input processing unit 200 may comprise the dynamic modification techniques and content described in FIG. 1. In alternative examples, a single system (comprising one or more components such as processor and/or memory) may perform the processing described in systems 100 and 200, respectively. Further, input processing unit 200 may comprise a user interface component as described in the description of FIG. 1.

With respect to FIG. 2, input processing unit 200 may comprise interface 202, characteristics generator 204 and estimation engine 206. Interface 202 may be configured to receive and process input. For example, interface 202 may receive a selection of media content to receive from one or more content providers. Based on the selection, interface 202 may cause one or more search queries to be generated and submitted to one or more search services or content providers, such as server devices 106A-C. In some aspects, interface 202 may then aggregate, organize and/or store the search result content. For example, interface 202 may organize the search result content into one or more media items to be presented in a particular order to a device, such as client devices 102A-C. In at least one example, interface 202 may further be configured to provide the search result content to a media evaluation component.

Characteristics generator 204 may be configured to identify and/or generate characteristics of media content. In aspects, characteristics generator 204 may receive media content transmitted using, for example, interface 202. Characteristics generator 204 may evaluate the media content to identify and/or determine characteristics (e.g., frequency, amplitude, variance, etc.) of the media content. In some examples, the evaluation may include analyzing metadata or a characteristics file associated with a received media item or portions of a downloading media item. The metadata or characteristics file may comprise characteristics and/or pre-computed characteristic values for the media item. In other examples, the evaluation may include analyzing the media content or portions thereof. For instance, characteristics generator 204 may load portions of a downloading file into a buffer. The buffered content may then be used to dynamically determine relevant media playback settings for the content or a portion of the content. Relevant media playback settings, as used herein, may be settings having non-zero, non-null or statistically meaningful values. For instance, characteristics generator 204 may analyze a received audio file to determine that the audio file comprises the characteristics duration, number of channels, channel mapping, sampling frequency and bit depth. A non-zero, non-null value may be recorded for the duration, sampling frequency and bit depth characteristics. As a result, duration, sampling frequency and bit depth may be determined to be the relevant media playback settings for the audio file. In some aspects, the dynamic determination may include playing or executing the buffered content using a corresponding application and recording the relevant media playback settings.

Estimation engine 206 may be configured to determine or estimate a preferred media configuration. In aspects, estimation engine 206 may receive media playback settings from, for example, characteristics generator 204. Estimation engine 206 may compare the received media characteristics to corresponding characteristics/values stored in a user profile, a media configuration file or a local buffer. Based on the comparison, estimation engine 206 may compute the differences between each of the stored characteristic values and the corresponding received characteristic values; thereby computing an estimation of the playback settings for the received media. In examples, estimation engine 206 may comprise a plurality of estimators. Each estimator may be assigned to compute a difference for a characteristic of a media item or media item type. In at least one example, estimators may be assigned according to media item type, such that a first set of estimators may be assigned to a first media type, a second set of estimators may be assigned to a second media type, etc. For example, estimation engine 206 may receive values for at least the frequency and amplitude characteristics of a downloading audio file and a currently-playing (or last-played) audio file. Estimation engine 206 may assign one or more estimators to the frequency calculations of one or more frequency ranges and one or more estimators to the amplitude calculation. The frequency and amplitude estimators may use an algorithm, function or statistical model to calculate the differences between the characteristic values of the downloading audio file and the characteristic values of a currently playing audio file.

In aspects, estimation engine 206 may aggregate the characteristics and/or the differences in characteristic values calculated by each estimator. Feedback may then be received for one or more aspects of the aggregated data. For example, the aggregated data (or portions thereof) may be provided to a user via an interface, such as interface 202. The user may be requested to select and/or rank the importance of a set of media characteristics and/or playback settings. Based on the selections/rankings, estimation engine 206 may assign scores and/or weights to the media characteristics, media playback settings and/or one or more estimators. For instance, a user may rank the top three most important characteristics for a particular media type. As a result, the estimation engine 206 may assign the top-ranked characteristic a score of 3.0, the second-ranked characteristic a score of 2.5, and the second-ranked characteristic a score of 2.0. The scores may then be applied to respective estimators such that higher score numbers result in a more drastic modification of a value towards a preferred value. The scores/weights may reflect the preferred settings for a particular media type, or for a particular media in a particular user session. In another example, the aggregated data (or portions thereof) may be evaluated against group-based feedback. The group-based feedback may be solicited from various users and may consider user commonality factors, such as region, demographics, interests, behaviors, media content, etc. In such an example, input processing unit 200 may provide estimation engine 206 access to commonality data for the user and/or client device receiving the content. The group-based feedback may be collected when estimation engine 206 is offline or idle (e.g., when the estimation engine is not currently processing received content), or dynamically when input processing unit 200 receives media content. In at least one example, dynamically collecting group-based feedback may comprise collecting and/or storing existing data from one or more data sources (e.g., databases, files, multimedia services, etc.). Based on the commonality factors, estimation engine 206 may assign scores and/or weights to one or more media characteristics, media playback settings and/or one or more estimators. The scores/weights may reflect or estimate the group's and/or current user's preferred playback settings for received content, media types or a particular media item.

In aspects, estimation engine 206 may use the characteristics, characteristic value data, scores and/or weights to modify the received content. For example, estimation engine 206 may offset the computed differences for the characteristic values of a received media item with playback settings such that the characteristic values of an effective received media are consistent with a set of preferred experience metrics. As another example, estimation engine 206 may modify the characteristic values of a received media item, such that the characteristic values of a received media are set closer to the values in a set of preferred settings. For instance, estimation engine 206 may compute a standard deviation for one or more values in the set of preferred settings. The characteristic values of a received media item may then be set within a computed range of variation. In a particular example, the characteristic values within the computed range of variation may be further modified based on the selections and/or ranking described above. In some aspects, estimation engine 206 may provide the modified content (e.g., received content and associated modified settings) to a media playing component. The media playing component may store the modified settings in the media playing component's sound settings. The media playing component may then apply the modified settings when playing or executing the received content or similar media types. In other aspects, estimation engine 206 may provide the modified content to a sound configuration component of input processing unit 200. The sound configuration component may store the modified settings as global settings for input processing unit 200, such that one or more applications use the global settings when playing/executing the received content or similar content. In at least one aspect, estimation engine 206 may use the modified content to train or modify one or more estimators and/or modify/update a set of preferred settings. For instance, estimation engine 206 may provide the characteristics and/or characteristic value data as input to corresponding estimators. The estimators may use the provided data to modify estimations of preferred characteristics and/or configurations of media.

Figure 3:
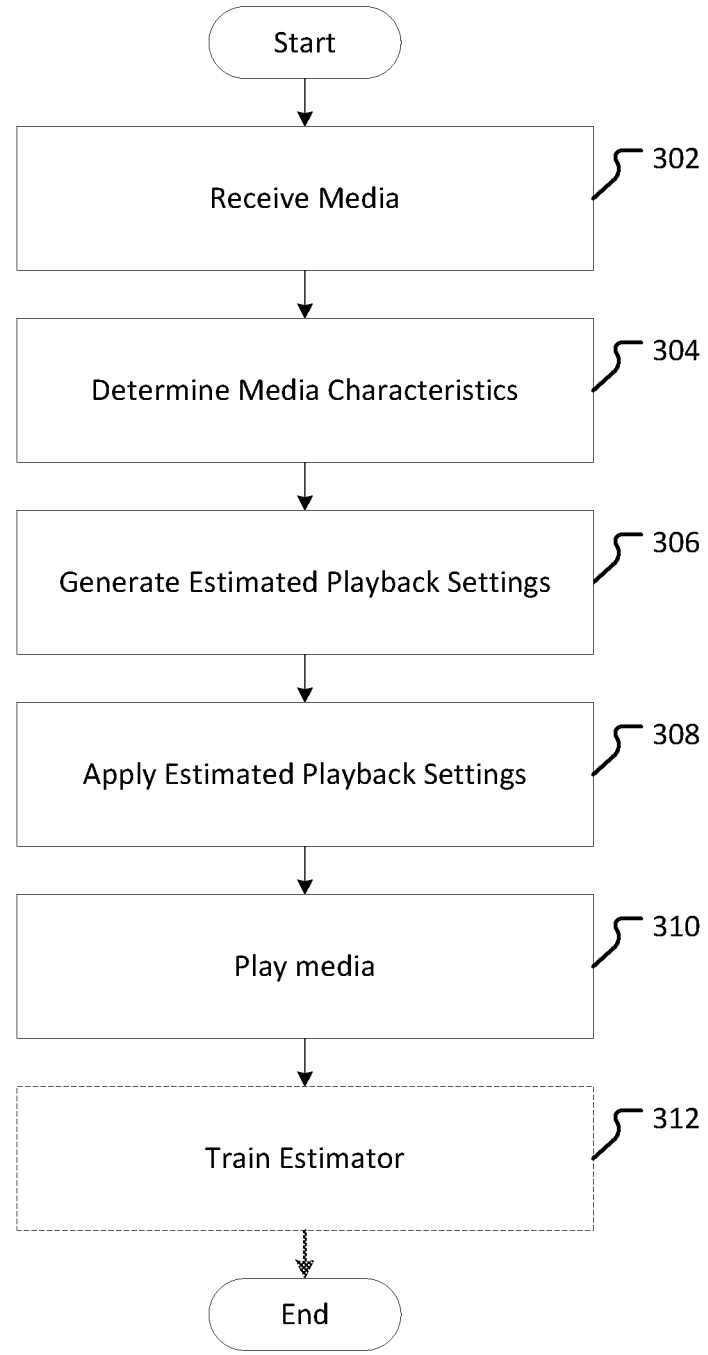
FIG. 3 illustrates an example method of dynamically modifying multimedia playback settings as described herein.

FIG. 3 illustrates an example method of dynamically modifying multimedia playback settings as described herein. In aspects, method 300 may be executed by an exemplary system such as system 100 of FIG. 1. In examples, method 300 may be executed on a device comprising at least one processor configured to store and execute operations, programs or instructions. However, method 300 is not limited to such examples. In other examples, method 300 may be performed on an application or service for providing query resolution. In at least one example, method 300 may be executed (e.g., computer-implemented operations) by one or more components of a distributed network, such as a web service/distributed network service (e.g. cloud service).

Exemplary method 300 begins at operation 302 where media content may be received by a computing device, such as input processing unit 200. In aspects, the computing device may request media content from one or more data sources using an interface, such as interface 202. In response to the request, the computing device may receive media content (or portions thereof) from a content provider or content repository, such as (but not limited to) client devices 102A-C and/or server devices 106A-C. The media content may comprise one or more media items of various types (e.g., audio, video, text, image, etc.). In examples, the media playback settings may vary between media types and/or between media items having the same media type. For instance, media content may comprise a first audio file from a first content provider and a second audio file from a second content provider. As a result the, the first and second audios file may have different, for example, playback volume, bass and treble settings. In some aspects, the computing device may aggregate and/or organize the media items and associated playback settings. The aggregated and/or organized media items may be presentable as, for example, a playback list or a content album.

At operation 304, media playback settings may be determined for received media items. In aspects, the received media items may be accessible by a characteristics identification component, such as characteristics generator 204. The characteristics identification component may evaluate media items that have been recently downloaded or are currently downloading. In some examples, the evaluation may include analyzing metadata and/or media playback settings data associated with received media content. For example, a parsing operation may be executed on the metadata and/or a media playback settings file transmitted in the media content. The parsing operation may include the use of pattern matching and/or fuzzy logic to identify characteristics and/or precomputed characteristic values for media items. In other examples, the evaluation may include dynamically analyzing the media content (or portions thereof). For example, the characteristics identification component (e.g., a media player component, a characteristics engine, or a related service) may have access to a recently downloaded file. The characteristics identification component may be able to preload the downloaded file (e.g., into memory or a pre-play environment), such that the characteristics and characteristic values for the entire file may be determined. In another example, a portions (e.g., five (5) second segments) of a downloading file may be loaded into a buffer of the computing device. The characteristics identification component may analyze each of the buffered content segments to dynamically determine characteristics for the downloading file. In some aspects, the determined characteristics and a designation of an associated media item may be copied to a data store. The data store may comprise media playback settings data for previously-played media items and/or currently-playing media items.

At operation 306, preferred playback setting may be estimated. In aspects, the media playback settings determined at operation 304 may be provided to a settings estimation component, such as estimation engine 206. The settings estimation component may have access to stored media characteristics data and/or media playback settings for previously-played media items, currently-playing media items and/or upcoming media items. The settings estimation component may additionally or alternately have access to a user profile or settings configuration file comprising preferred media settings for a user or a group of users. Based on the media characteristics data and preferred settings, the settings estimation component may be able to compute differences between one or more of the stored characteristic values and the corresponding received characteristic values. For example, a currently-playing audio file may comprise a mean amplitude of 40 dB, a minimum frequency of 50 Hz and a maximum frequency of 350 Hz. The upcoming audio file may comprise a mean amplitude of 50 dB, a minimum frequency of 60 Hz and a maximum frequency of 480 Hz. The settings estimation component may evaluate a user profile to determine that the user possesses an aversion to significant variances in amplitude and is nearly apathetic to variances in frequency. Accordingly, the settings estimation component may only compute the estimated gain/loss of power (or corresponding setting change) to apply to the amplitude of the upcoming audio file settings to maintain a consistent volume between the currently-playing audio file and the upcoming audio file. In another example, a first portion of a streaming video file may comprise a minimum amplitude of 30 dB and a maximum amplitude of 50. A segment (e.g., 5 seconds) of the streaming video file may be buffered prior to rendering. The settings estimation component may determine that the buffered content comprises a minimum amplitude of 20 dB and a maximum amplitude of 90. Accordingly, the settings estimation component may compute the estimated gain/loss of power (or corresponding setting change) to apply to the minimum and maximum amplitudes of the buffered content settings to normalize the volume of the streaming video file.

At operation 308, the estimated playback setting may be applied. In aspects, a settings estimation component may use estimated value changes and/or settings modifications to modify upcoming/buffered media content. For example, the settings estimation component may have access to one or more estimators or instances of estimators. Based on the characteristics and/or the computed differences between the characteristic values of a currently playing media file and an upcoming media file, the settings estimation component may assign one or more estimators to evaluate one or more characteristics. The estimators may apply the computed differences for their respective assigned characteristics such that the playback settings of the upcoming media file are set the same as (or reasonably similar to) the playback settings of the currently playing media file. In some aspects, the estimated value changes and/or settings modifications may be altered in accordance with one or more forms of external feedback. For example, prior to applying the estimated playback setting, the settings estimation component may present the estimated playback setting to a user via a user interface. The user interface may be operable to allow the user to accept input, such as a selection of a set of media data to modify, a ranking of a set of media playback settings, assignments of weights to estimators and/or media playback settings, modifications to characteristic values, etc. Based on the input, characteristic values (and/or corresponding playback settings) may be modified and applied to the upcoming media file. For instance, a received weight assignment for an estimator or characteristic(s) may be applied to the estimator, and the estimated playback setting may be re-estimated by the settings estimation component in accordance with the weight. In another example, after applying the estimated playback setting to upcoming media content, the settings estimation component may access group-based feedback. The group-based feedback may be solicited from various users, evaluated (e.g., aggregated, organized, scored, etc.) and stored in one or more data repositories. The group-based feedback may correspond to media types, media items and/or characteristics, and may be based on user commonality factors, such as region, demographics, interests, behaviors, media content, etc. Based on the group-based feedback, characteristic values (and/or corresponding playback settings) may be modified applied to the upcoming and future media content. In aspects, the dynamically modified characteristic values and/or settings may reflect or estimate a user's or group's preferred playback settings for received content, media types or a particular media item.

At operation 310, modified media content may be played/executed. In aspects, modified media content (e.g., media content having modified playback settings) may be received by a multimedia service/application. The multimedia service/application may apply the modified playback settings for the media content to a media configuration file or data structure. For example, a media player application may apply modified playback settings locally such that the modified playback settings will be used when the media player application is used to play the associated media content. As another example, a multimedia service may apply modified playback settings globally on a client device. As a result, the default playback settings for each multimedia service/application on the client device may be set to the modified playback settings. As yet another example, a multimedia server may apply a group-based playback setting to a multimedia file before transferring or streaming it to client(s).

At optional operation 312, modified media content may be used to train the settings estimation component. In aspects, the settings estimation component may have access to information, such as the modified media content, selections/rankings, group-based feedback, etc. Such information may be used to prioritize and/or train one or more estimators. For example, a user may rank the importance of a set of media playback settings for a media item (e.g., 1) amplitude, 2) brightness, 3) bass, etc.). The rankings may be provided to the settings estimation component. Based on the rankings, the settings estimation component may assign one or more estimators to the respective characteristics (e.g., an amplitude estimator, a brightness estimator, a bass estimator, etc.). Additionally or alternatively, the settings estimation component may assign a weight to an estimator, such that the assigned weight approximates the importance of a corresponding characteristic. As another example, group-based feedback comprising frequently used characteristic and associated values may be used to alter the characteristic values of a media file. The feedback may be provided as input to the settings estimation component. Based on the feedback, the settings estimation component may train one or more estimators to estimate characteristic values that correspond (or substantially correspond) to the values in the feedback. In some aspects, the settings estimation component may use such information to modify a user profile or set of preferred settings. In aspects, estimator components may be trained by observing/tracking users' behavior (e.g., change in playback settings) upon playing the media with the estimated playback settings, which may be used to estimate the performance of the estimator.

FIGS. 4-7 and the associated descriptions provide a discussion of a variety of operating environments in which aspects of the disclosure may be practiced. However, the devices and systems illustrated and discussed with respect to FIGS. 4-7 are for purposes of example and illustration and are not limiting of a vast number of computing device configurations that may be utilized for practicing aspects of the disclosure, described herein.

Figure 4:
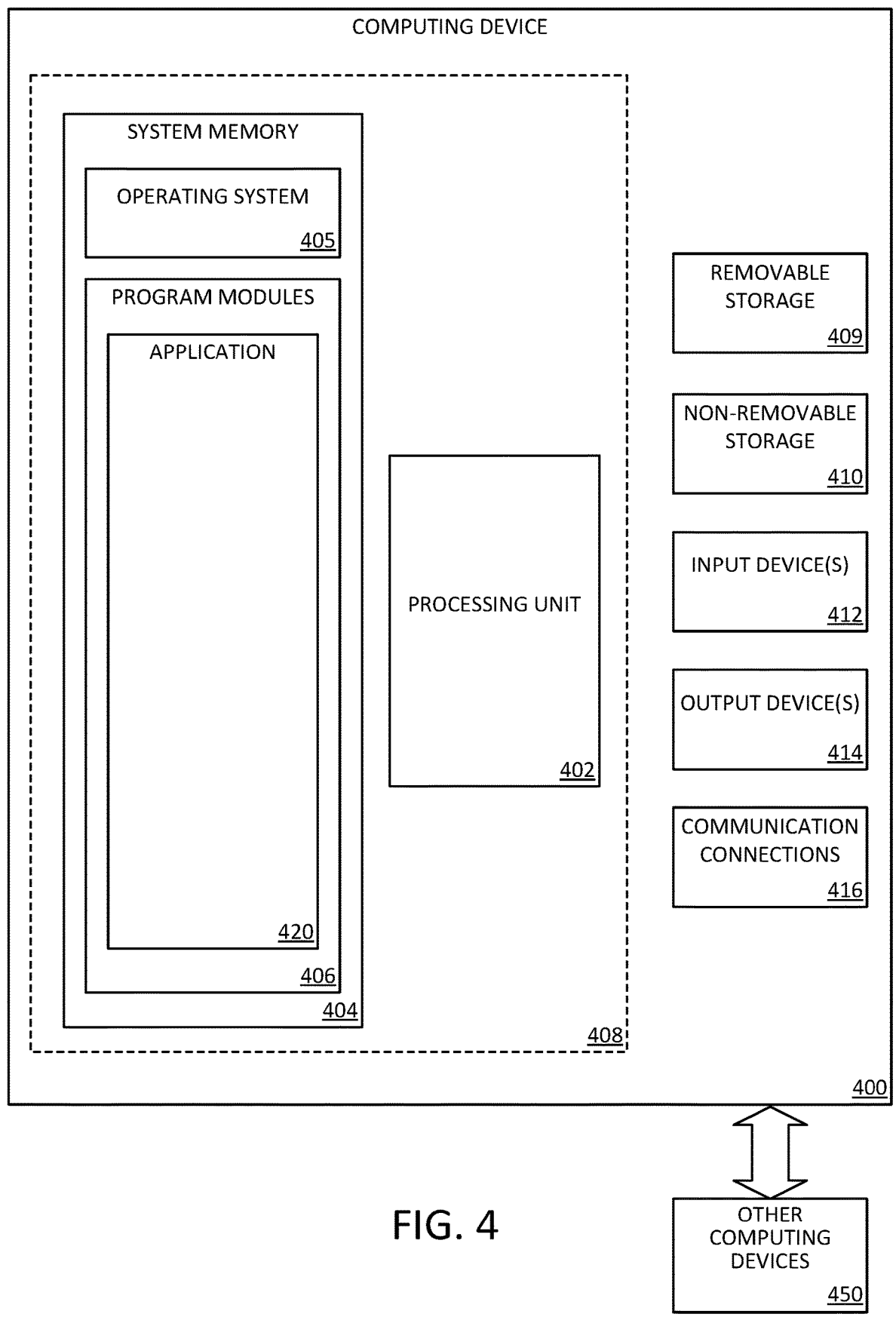
FIG. 4 is a block diagram illustrating example physical components of a computing device with which aspects of the disclosure may be practiced.

FIG. 4 is a block diagram illustrating physical components (e.g., hardware) of a computing device 400 with which aspects of the disclosure may be practiced. The computing device components described below may be suitable for the computing devices described above, including the client computing devices 102A-C and the server computing devices 106A-C. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running software application 420, such as one or more components supported by the systems described herein. The operating system 405, for example, may be suitable for controlling the operation of the computing device 400. Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 (e.g., application 420) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5A:
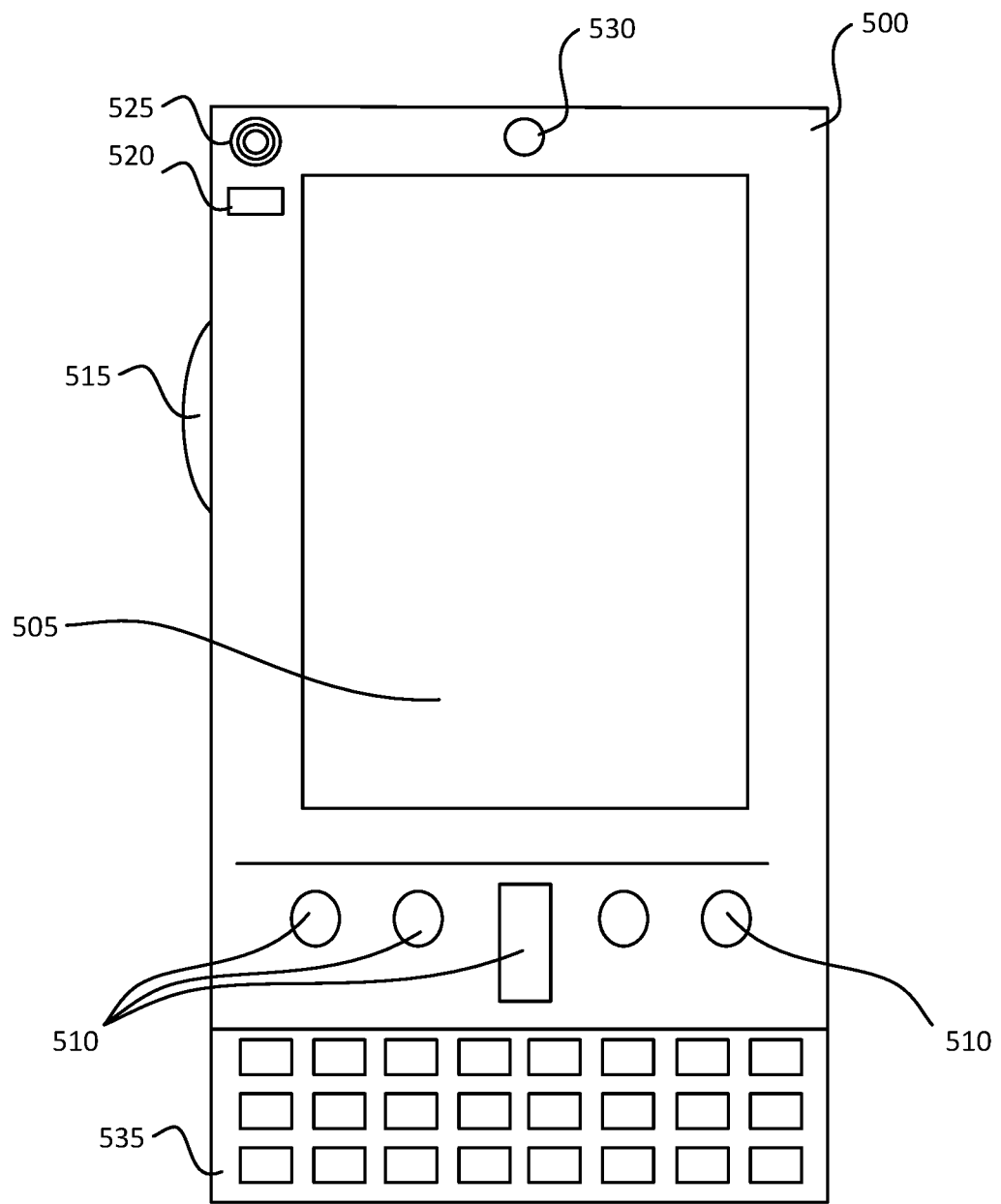
FIGS. 5A and 5B are simplified block diagrams of a mobile computing device with which aspects of the present disclosure may be practiced.
Figure 5B:
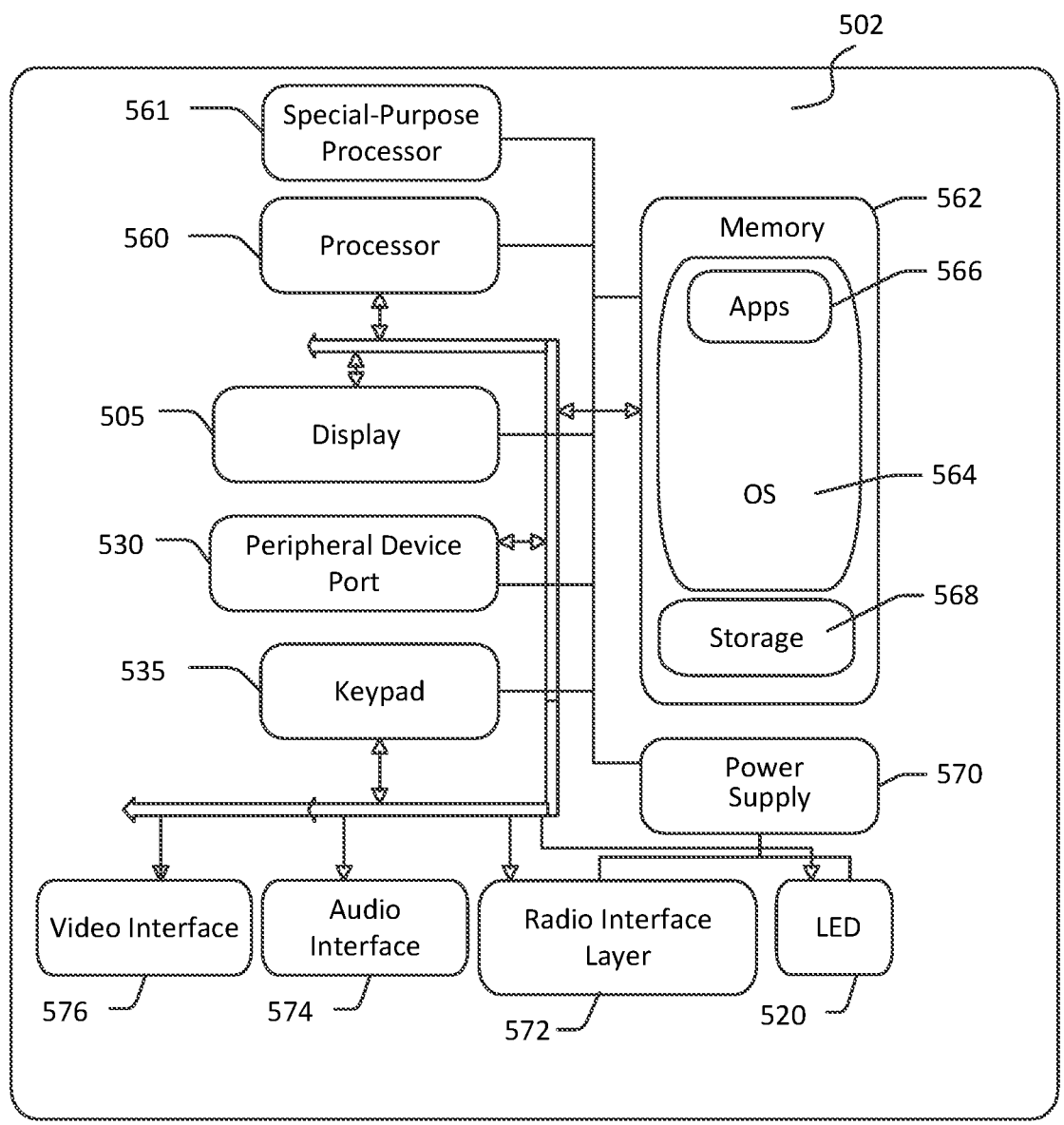

FIGS. 5A and 5B illustrate a mobile computing device 500, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 5A, one aspect of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative aspects, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some aspects, the mobile computing device 500 incorporates a vibration transducer for providing the user with tactile feedback. In yet another aspect, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one aspect of a mobile computing device. That is, the mobile computing device 500 can incorporate a system (e.g., an architecture) 502 to implement some aspects. In one embodiment, the system 502 is implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500 described herein (e.g., search engine, extractor module, relevancy ranking module, answer scoring module, etc.).

The system 502 has a power supply 570, which may be implemented as one or more batteries. The power supply 570 might further include an external power source, such as an AC adapter or a powered docking cradle that supplements or recharges the batteries.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator 520 may be used to provide visual notifications, and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor(s) (e.g., processor 560 and/or special-purpose processor 561) and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present disclosure, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio interface layer 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio interface layer 572 or via a distributed computing network. Similarly, such data/information may be readily transferred between computing devices for storage and use according to well-known data/information transfer and storage means, including electronic mail and collaborative data/information sharing systems.

Figure 6:
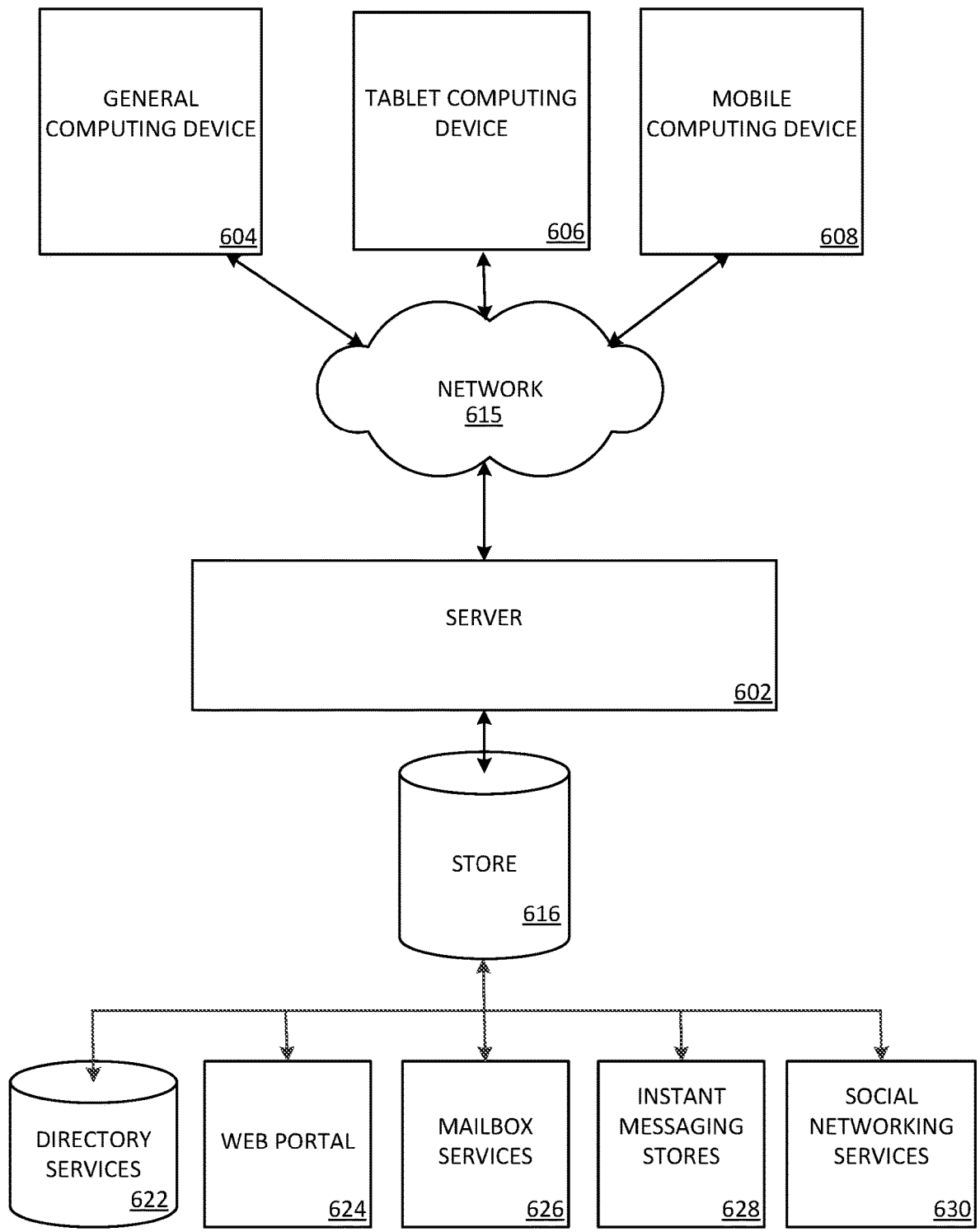
FIG. 6 is a simplified block diagram of a distributed computing system in which aspects of the present disclosure may be practiced.

FIG. 6 illustrates one aspect of the architecture of a system for processing data received at a computing system from a remote source, such as a personal computer 604, tablet computing device 606, or mobile computing device 608, as described above. Content displayed at server device 602 may be stored in different communication channels or other storage types. For example, various documents may be stored using a directory service 622, a web portal 624, a mailbox service 626, an instant messaging store 628, or a social networking site 630. The server device 602 may provide data to and from a client computing device such as a personal computer 604, a tablet computing device 606 and/or a mobile computing device 608 (e.g., a smart phone) through a network 615. By way of example, the computer system described above may be embodied in a personal computer 604, a tablet computing device 606 and/or a mobile computing device 608 (e.g., a smart phone). Any of these embodiments of the computing devices may obtain content from the store 616, in addition to receiving graphical data useable to be either pre-processed at a graphic-originating system, or post-processed at a receiving computing system.

Figure 7:
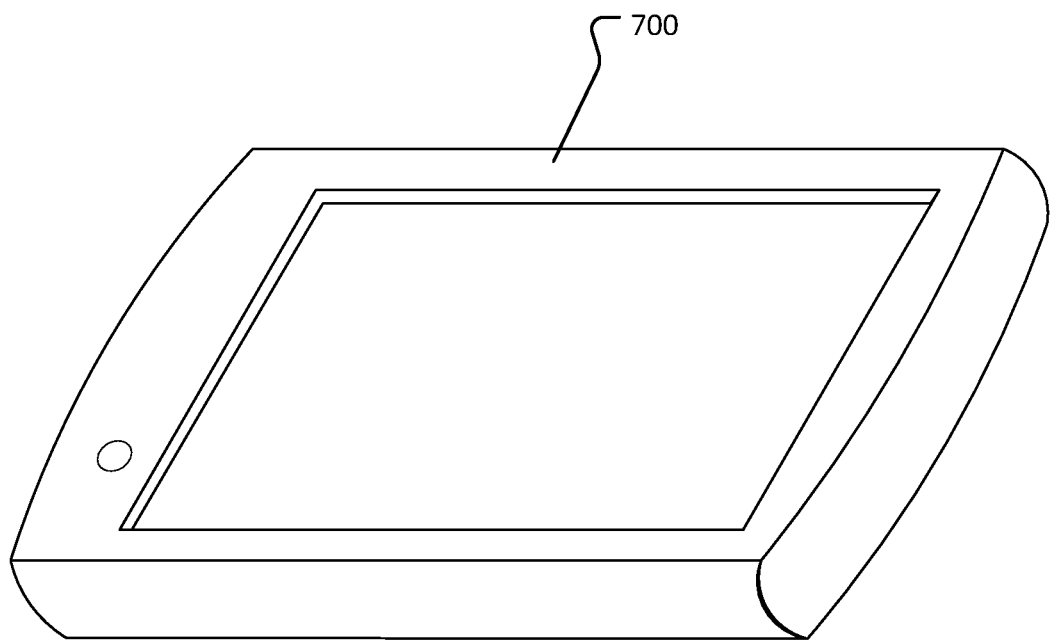
FIG. 7 illustrates a tablet computing device for executing one or more aspects of the present disclosure.

FIG. 7 illustrates an exemplary tablet computing device 700 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
at least one processor; and
memory coupled to the at least one processor, the memory comprising computer executable instructions that, when executed by the at least one processor, perform a method for dynamically modifying multimedia playback settings, the method comprising:
receiving, by a playback device, first media content;
determining a first set of playback settings of the first media content;
based on user preference data associated with the playback device, identifying a stored set of playback settings;
executing, by the playback device, the first media content using the stored set of playback settings;
receiving, by the playback device, second media content;
determining a second set of playback settings of the second media content, wherein the second set of playback settings comprises at least one precomputed metric for the playback of the second media content;
comparing, by the playback device, the stored set of playback settings to the second set of playback settings, wherein the comparing comprises computing a difference between one or more values in the stored set of playback settings and one or more values in the second set of playback settings, the one or more values corresponding to at least one of: volume, bass, pitch, or brightness;
based on the comparison, estimating, by the playback device, a third set of playback settings for the second media content;
dynamically applying, by the playback device, the third set of playback settings to the second media content; and
executing the second media content using the third set of playback settings.

2. The system of claim 1, wherein the determining the second set of playback settings comprises dynamically analyzing the second media content to identify playback settings for second media content.

3. The system of claim 1, wherein the determining the second set of playback settings comprises evaluating metadata of the second media content to identify precomputed characteristic values.

4. The system of claim 1, wherein the stored set of playback settings are associated with at least one of a previously-played media item, a currently-playing media item, a user profile and a setting configuration file.

5. The system of claim 1, wherein estimating the third set of playback settings comprises using the computed differences to modify the one or more values in the second set of playback settings to be within a standard deviation of one or more corresponding values in the stored set of playback settings.

6. The system of claim 1, wherein estimating the third set of playback settings comprises using the computed differences to modify the one or more values in the second set of playback settings to be same as one or more corresponding values in the stored set of playback settings.

7. The system of claim 1, wherein the estimating is performed by an estimation engine comprising one or more estimators, wherein at least one of the one or more estimators is assigned to evaluate one or more characteristics of the second set of playback settings.

8. The system of claim 1, wherein estimating the third set of playback settings comprises receiving at least one of a selection of media characteristics, a ranking of media characteristics, an assigned weight, and modified media characteristic values.

9. The system of claim 1, wherein estimating the third set of playback settings comprises evaluating group-based feedback, wherein the group-based feedback is based on at least one of region, demographics, interests, behaviors and media content.

10. The system of claim 1, further comprising training an estimation model using the third set of playback settings, wherein the estimation model is configured to estimate a preferred configuration for the second media content.

11. The system of claim 10, further comprising using the third set of playback settings to update at least one of a user profile and a setting configuration file.

12. The system of claim 1, wherein the user preference data is collected from a user profile associated with the playback device.

13. A method for dynamically modifying multimedia playback settings, the method comprising:
receiving, by a playback device, first media content;
determining at least a first set of playback settings of the first media content, wherein the first set of playback settings comprises at least one precomputed metric for the playback of the first media content;
comparing the first set of playback settings to a second set of playback settings for second media content, wherein the comparing comprises computing a difference between one or more values in the first set of playback settings and one or more values in the second set of playback settings, the one or more values corresponding to at least one of: volume, bass, pitch, or brightness;
based on the comparison, estimating a third set of playback settings for the first media content;
dynamically applying the third set of playback settings to the first media content; and
executing the first media content using the third set of playback settings.

14. The method of claim 13, wherein the first media content is associated with a media type and the second media content is associated with the media type.

15. The method of claim 13, wherein the first media content comprises at least a first media item associated with a first playback setting in the first set of playback settings and a second media item associated with a second playback setting in the first set of playback settings.

16. The method of claim 13, wherein the determining the first set of playback settings comprises dynamically analyzing the first media content to identify at least one of media characteristics and media characteristics values for the first media content.

17. The method of claim 16, further comprising:
presenting the third set of playback settings in a user interface;
receiving input from the user interface, wherein the input comprises at least one of a selection of one or more settings in the third set of playback settings, a ranking of the media characteristics, and one or more weights assigned to the media characteristics; and
based on the input, modifying the third set of playback settings.

18. The method of claim 17, wherein modifying the third set of playback settings comprises at least one of:
assigning a weight to one or more media characteristics in the input, and re-estimating the third set of playback settings; and
modifying the characteristics values in the third set of playback settings.

19. The method of claim 17, further comprising:
adjusting an estimation model based on feedback comprising at least on one of solicited user feedback and unsolicited user feedback; and
using the feedback to improve performance of the estimation model.

20. A system comprising:
at least one processor; and
memory coupled to the at least one processor, the memory comprising computer executable instructions that, when executed by the at least one processor, perform a method for dynamically modifying multimedia playback settings, the method comprising:
receiving first media content, the first media content comprising a first media item having a first media type and a second media item having a second media type;
determining a first playback setting for the first media item and a second playback setting for the second media item, wherein determining the first playback setting comprises dynamically analyzing the first media item to identify a first set of values for media playback characteristics associated with the first media item, and determining the second playback setting comprises dynamically analyzing the second media item to identify a second set of values for media playback characteristics associated with the second media item;
comparing the first playback setting to a stored third playback setting for the first media type, wherein the comparing comprises computing differences between one or more values in the first set of values and one or more corresponding values in the stored third playback setting, the one or more values in the first set of values relating to at least one of: volume, bass, pitch, or brightness;
comparing the second playback setting to a stored fourth playback setting for the second media type, wherein the comparing comprises computing differences between one or more values in the second set of values and one or more corresponding values in the stored fourth playback setting, the one or more values in the second set of values relating to at least one of: volume, bass, pitch, or brightness;
based on the comparisons, estimating a fifth playback setting for the first media item, and estimating a sixth playback setting for the second media item;
when the first media content is executed, dynamically applying the fifth playback setting to the first media content; and
when the second media content is executed, dynamically applying the sixth playback setting to the second media content.

* * * * *